United States Patent
Whitacre

(10) Patent No.: US 6,357,824 B1
(45) Date of Patent: Mar. 19, 2002

(54) BEACH/FIELD RECLINER

(76) Inventor: Bruce E. Whitacre, BEW Enterprises, 7006 Trappers Ct., Manassas, VA (US) 20111-4378

( * ) Notice: Subject to any disclaimer, the term of this patent is extended or adjusted under 35 U.S.C. 154(b) by 0 days.

(21) Appl. No.: 09/617,031

(22) Filed: Jul. 14, 2000

(51) Int. Cl.[7] .............................................. A47C 13/00
(52) U.S. Cl. ..................................... 297/118; 280/648
(58) Field of Search .................................. 297/118, 129, 297/452.14, 16.1; 280/30, 7.12, 8, 7.1, 648

(56) References Cited

U.S. PATENT DOCUMENTS

| | | | |
|---|---|---|---|
| 2,546,493 A | * | 3/1951 | Booth ........................ 280/648 |
| 3,580,592 A | | 5/1971 | Schrecengost |
| 3,659,865 A | | 5/1972 | Nothacker |
| 3,822,069 A | | 7/1974 | Hoff |
| 3,930,662 A | * | 1/1976 | Manner ...................... 280/648 |
| 4,533,151 A | | 8/1985 | Maitland |
| 4,694,979 A | | 9/1987 | Ables |
| 4,934,719 A | * | 6/1990 | duPont ................... 280/47.131 |
| 5,039,130 A | | 8/1991 | Sheiman et al. |
| 5,056,804 A | | 10/1991 | Wilson et al. |
| 5,265,892 A | | 11/1993 | Said |
| 5,269,157 A | | 12/1993 | Ciminelli et al. |
| 5,295,556 A | | 3/1994 | Mullin |
| D355,743 S | | 2/1995 | Hammack et al. |
| 5,577,746 A | | 11/1996 | Britton |
| 5,620,191 A | | 4/1997 | Sayette |
| D400,475 S | | 11/1998 | Parker |
| 5,873,582 A | | 2/1999 | Kauffman, Jr. et al. |
| 5,897,131 A | | 4/1999 | Brown et al. |
| 6,039,333 A | * | 3/2000 | Hamblin ................... 280/47.18 |
| 6,139,029 A | * | 10/2000 | Shaw ............................ 280/8 |

FOREIGN PATENT DOCUMENTS

| | | |
|---|---|---|
| GB | 2 113 622 A | 8/1983 |
| WO | WO 96/26858 | 9/1996 |

* cited by examiner

Primary Examiner—Jerry Redman
(74) Attorney, Agent, or Firm—Richard C. Litman

(57) ABSTRACT

A convertible beach/field apparatus comprises a one-piece seat/sled component fabricated of plastic or fiberglass. The component has a spoon-shaped front end and an inclined rear end. A frame is provided to support the component. The frame includes two quadrilateral members which share and are rotatable about a common side. The quadrilateral members may assume a first position whereby the apparatus can be used as an inclined seat. A second position of the quadrilateral members and the addition of wheels will allow the apparatus to be utilized as a cart. The component alone may function as a sled.

9 Claims, 3 Drawing Sheets

BEACH/FIELD RECLINER

BACKGROUND OF THE INVENTION

1. Field of the Invention

The present invention generally relates to land vehicles. More specifically, the present invention is drawn to an apparatus which may be converted to a sled, cart, or chair.

2. Description of the Related Art

The hunter, camper or beach-goer is always in need of rugged, adaptable, uncomplicated conveyance apparatus to transport equipment in and out of the field or to and from the beach. It is a boon if the conveyance apparatus can provide multiple functions.

Examples of multi-purpose conveyance apparatus for hunters and/or campers are disclosed in U.S. Pat. No. 3,580,592 (Schrecengost), U.S. Pat. No. 4,694,979 (Ables), U.S. Pat. No. 5,295,556 (Mullin) and U.S. Pat. No. 5,873,582 (Kauffman, Jr. et al.). All of the above show apparatus which is relatively complicated to assemble and convert as compared with the apparatus of the instant invention.

U.S. Pat. No. Des. 355,743 (Hammack et al.), U.S. Pat. No. Des. 3,822,069 (Hoff), U.S. Pat. No. Des. 4,533,151 (Maitland), U.S. Pat. No. Des. 5,056,804 (Wilson et al.), U.S. Pat. No. Des. 5,265,892 (Said) and U.S. Pat. No. Des. 5,269,157 (Ciminelli et al.) all disclose apparatus which is convertible for multiple purposes. However, none of the disclosed apparatus is rugged enough to be utilized for transporting equipment in and out of the severe environment traversed by hunters and/or campers.

U.S. Pat. No. Des. 400,475 (Parker), U.S. Pat. No. Des. 5,039,130 (Sheiman et al.), U.S. Pat. No. Des. 5,620,191 (Sayette), U.S. Pat. No. Des. 5,897,131 (Brown et al.) and W.I.P.O. Patent number WO 96/26858 show sledding apparatus. None of the above inventions exhibit the versatility as disclosed in the instant invention.

U.S. Pat. No. 5,577,746 (Britton) and United Kingdom Patent number 2 113 622 A show folding, transporting vehicles which have no other functions.

U.S. Pat. No. 3,659,865 (Nothacker) shows a one-piece safety seat for a child, which seat can be provided with wheels or sled runners if desired.

None of the above inventions and patents, taken either singularly or in combination, is seen to disclose a beach/field recliner as will be subsequently described and claimed in the instant invention.

SUMMARY OF THE INVENTION

The present invention is drawn to an apparatus adapted for use in a hunting, camping or beach environment. The apparatus is versatile in that it may be quickly and easily converted from a reclining backrest chair to a cart or sled. When in the form of a cart or sled, the apparatus can be used to haul game carcasses and/or equipment in and out of the field or to carry gear (coolers, umbrellas, etc,) to and from the beach.

Simplistic in design, the apparatus comprises two main elements, an adjustable frame member and a rigid seat/sled component. The adjustable frame member functions as a backrest support when the apparatus is used as a chair and as a carriage and pull handle when the apparatus is used as a cart. Two wheels may be attached to the frame member when the apparatus is to be utilized in its cart form. A strap is provided to support the frame in the chair position and to function as a harness to facilitate pulling when the apparatus is in its cart form. When not in use, the frame can be folded flat and placed in the seat/sled component for easy transport.

Accordingly, it is a principal object of the invention to provide a multi-purpose apparatus capable of functioning as a reclining chair, cart or sled.

It is another object of the invention to provide a multi-purpose apparatus which is durable and rugged.

It is a further object of the invention to provide a multi-purpose apparatus which is easy to use.

Still another object of the invention is to provide a multipurpose apparatus which comprises a minimum number of parts.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
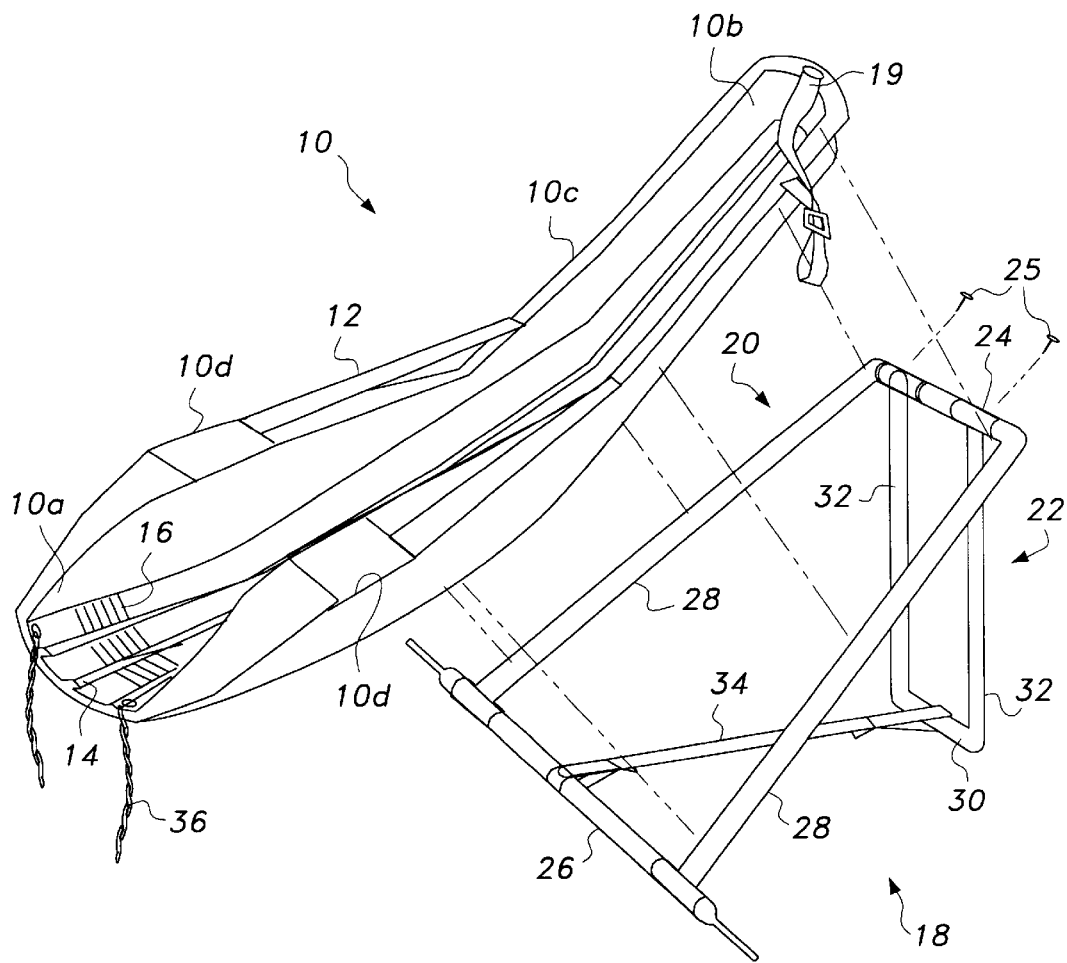
FIG. 1 is an exploded, perspective view of a beach/field recliner according to the present invention.

Attention is first directed to FIG. 1. A sled/seat component is sized to support the upper body of an average adult and is approximately four feet long and two feet wide. The lower half or bow 10a of the component fans into a spoon shape so as to present a comfortable position for the sitter when the apparatus is used as a chair. The upper half 10b of the component is slightly inclined to act as a backrest. One-piece component 10 is fabricated from a lightweight, rugged material such as plastic or fiberglass. Members 12 are positioned on each side to create handholds for lifting or to provide means for tying equipment to the component. Lengthwise channels 14 are disposed in member 10. Channels 14 function to provide rigidity, move fluids and debris away from the occupant and act as runners when member 10 is used as a sled. Ridges 16 are positioned on the lower half 10a to provide a frictional force to prevent an occupant, when sitting, from sliding out of the component. An overhanging rim 10c disposed along the perimeter of the component is designed to add strength and to also engage a supporting frame generally indicated at 18. Fenders 10d are provided as protection from rotating wheels as will be further explained below.

Frame 18 consists of two quadrilateral members 20 and 22 of different sizes and which share a common side 24. The larger quadrilateral member 20 has a side 26 parallel to common side 24. Legs 28 form the other sides of member 20. Smaller quadrilateral member 22 comprises a side 30 which is parallel with common side 24, and parallel legs 32. Member 22 can be rotated three-hundred sixty degrees around side 24. As shown in FIG. 1, frame 18 is positioned in the reclining chair mode wherein component 10 is adapted to be supported on frame 18. An adjustable strap 34, attached to side 30, is removably fastened to side 26 to support frame 18 and component 10 at the desired degree of inclination. A strap 19 is attached to the top of the sled and to side 24 to prevent the sled from sliding down from the frame.

Figure 2:
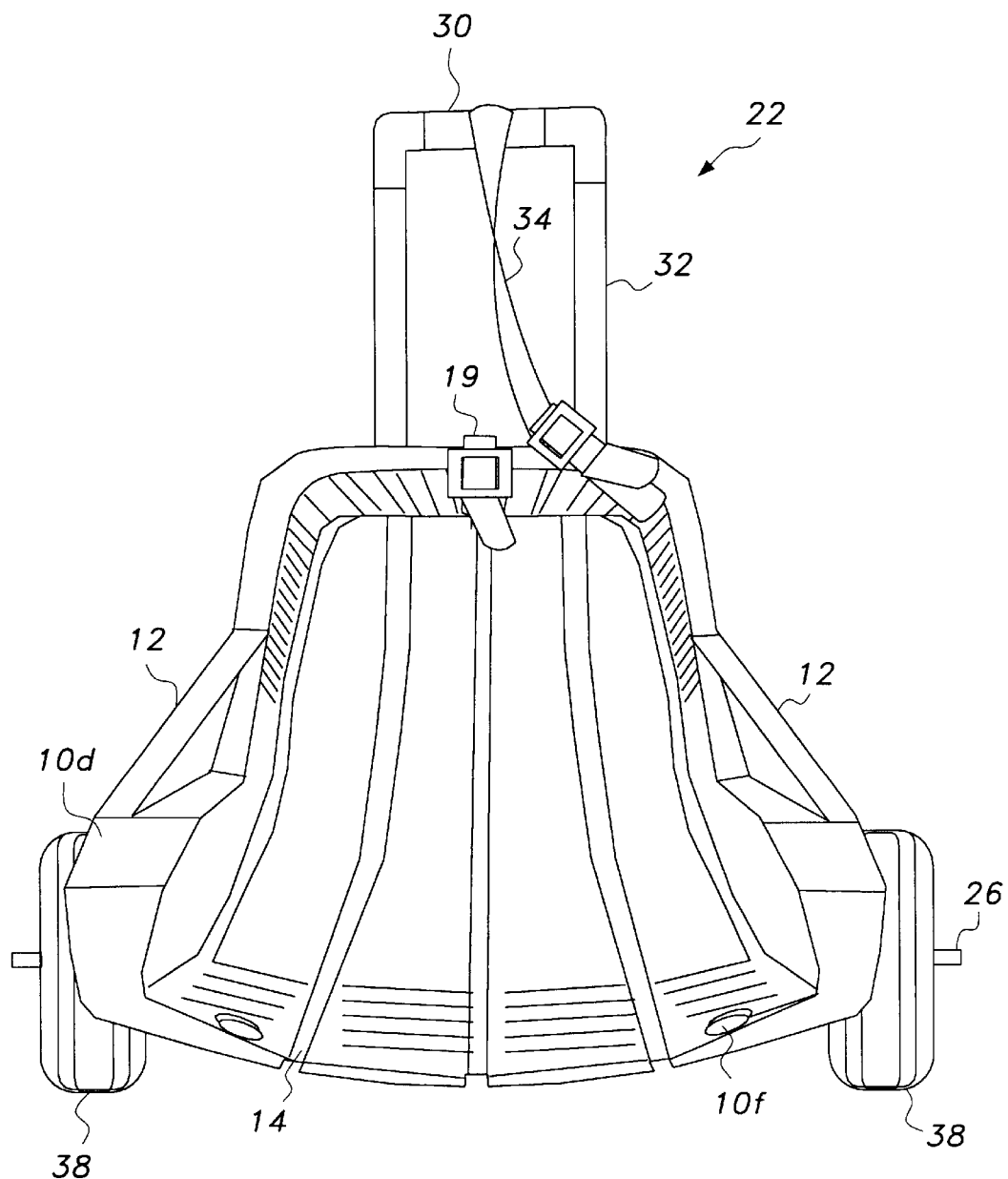
FIG. 2 is a front view of a beach/field recliner in its cart form according to the present invention.

To adapt the device to function as a cart a user would simply remove strap 34 from side 26 and rotate member 22 to the position shown in FIG. 2. A pair of wheels 38 is provided for rotatable attachment to side 26. In this configuration side 30 becomes a handle for pulling the cart and side 26 now functions as an axle. A pair of pins 25 (FIG. 1) may be provided to lock the handle in place if necessary. Strap 34 may be utilized as a shoulder harness for pulling the cart by merely adjusting the loop.

Figure 3:
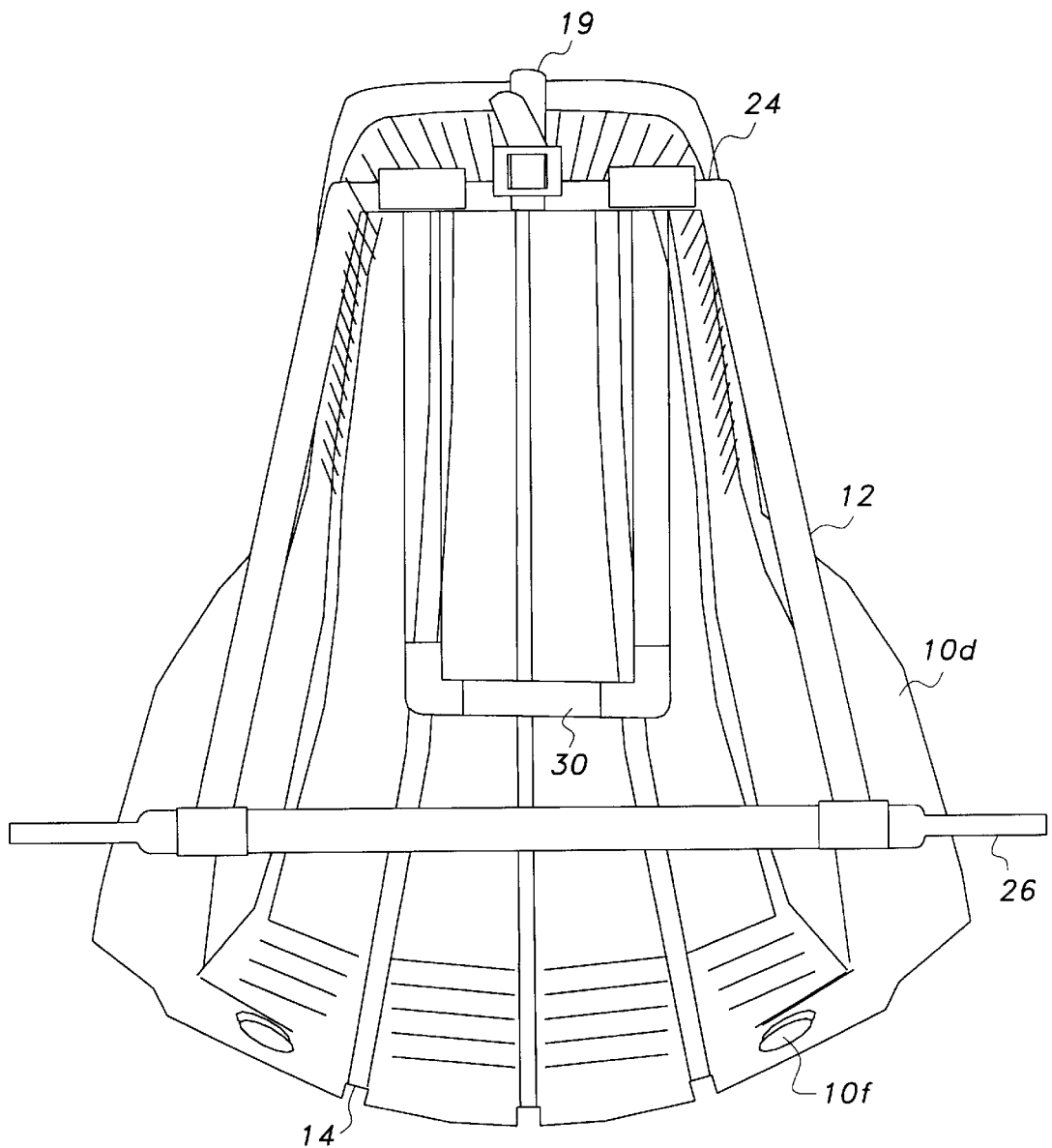
FIG. 3 is a front view of a beach/field recliner in its sled form according to the present invention.

In the sled mode frame 18 is simply folded flat and rotated to a stowed position (FIG. 3) so that component 10 can be dragged along the terrain. Ropes 36 (FIG. 1) may be inserted in openings 10f to facilitate pulling component 10.

It is to be understood that the present invention is not limited to the embodiments described above, but encompasses any and all embodiments within the scope of the following claims.

I claim:

1. A convertible apparatus comprising:

a unitary component, said component having a front end, a rear end, a bottom, two sides and a perimeter;

a spoon-shaped portion defined at said front end;

an inclined portion defined at said rear end;

plural channels in said bottom, said channels disposed in a direction from said rear end to said front end;

an array of ridges in said bottom, said ridges positioned adjacent said front end;

a frame; and a member connected to the frame which rotates between a first position to support the apparatus as a chair recliner and a second position to allow the member to be used as a handle thereby converting the apparatus into a sled.

2. The convertible apparatus as recited in claim 1, including fenders formed on each side of said component.

3. The convertible apparatus as recited in claim 1, including a pair of openings formed adjacent said front end.

4. The convertible apparatus as recited in claim 1, including a first strap, said first strap attached to the rear end of said component.

5. The convertible apparatus as recited in claim 4, wherein said first strap is attached to said common side.

6. The convertible apparatus as recited in claim 5, including a second strap, said second strap attached to said frame.

7. The convertible apparatus as recited in claim 6, wherein said second strap is adjustable.

8. The convertible apparatus as recited in claim 7 wherein the frame further comprises a pair of wheels, said pair of wheels being rotatably disposed on opposite sides of the frame to form a cart.

9. The convertible apparatus as recited in claim 7, including means for locking the apparatus in the first position.

\* \* \* \* \*